Sept. 8, 1959 N. KENNEY 2,903,043
AUTOMOBILE SEAT
Filed July 22, 1957

INVENTOR:
Nolan Kenney
By
Attorney

United States Patent Office 2,903,043
Patented Sept. 8, 1959

2,903,043

AUTOMOBILE SEAT

Nolan Kenney, Wauwatosa, Wis.

Application July 22, 1957, Serial No. 673,216

7 Claims. (Cl. 155—5)

This invention relates to an automobile seat and more particularly to one which includes a movable element forming a load supporting surface of the seat which will permit a person seated thereon to shift position from one end of the seat to the other by movement of the load supporting element without sliding across the surface of the seat.

The primary object of the present invention resides in the provision of a simple and effective means which will permit a person to shift position from one side of the car to the other on the movable element rather than hitching or sliding across the seat.

Another object of the invention resides in the provision in an automobile seat of a movable element forming a load supporting surface of the seat to afford a safety feature which will encourage a person to enter or leave the car from the curb side of the vehicle rather than endangering life and limb by attempting to enter or leave the car from the road side thereof.

Another object resides in the provision of a new and improved automobile seat which includes an element extending substantially the full width of the seat and which is movable with respect to the fixedly positioned seat to facilitate the changing of a person's position from the passenger side of the car to a position behind the steering wheel or vice versa.

Another object resides in the provision of a new and improved automobile seat including a movable element in the form of an endless conveyor forming the load supporting portion of the seat and adapted for lengthwise movement to permit a person seated thereon to move from one side of the seat to the other on the endless conveyor rather than hitching or sliding across the seat.

Another object resides in the provision of a new and improved automobile seat including a movable element forming a load supporting surface of the seat of latching means operable to releasably retain the movable element in fixed relationship with the seat.

Another object resides in the provision in a new and improved automobile seat including a movable element of cooperating stop means respectively secured to the fixedly positioned seat and the movable element to limit the extent of movement of the element with respect to the seat.

Another object resides in the adjustable positioning of the stop means secured to the movable element to permit alteration of its position on the movable element to insure uniform wear on the entire surface of the movable element.

Another object is to provide a new and improved automobile seat which will reduce the wear and tear on both clothing and the automobile seat which results from friction caused by repeatedly sliding or hitching across the seat upon entering or leaving the car.

Other objects and advantages will become apparent from the following description of an illustrative embodiment of the invention shown in the accompanying drawing.

To the best of my knowledge, no simple and effective means has ever been devised or provided in an automobile seat for facilitating the shifting of a person's position from one side of the seat to the other without requiring sliding or hitching across the seat.

In addition to facilitating the ready movement of a person from one side of the automobile seat to the other, on the movable element, the present invention affords a safety feature which will encourage a person to enter and leave the car from the curb side rather than the road side to thus reduce the possibility of personal injury.

The embodiment of the present invention chosen for illustration purposes in the accompanying drawing is incorporated in the usual removable portion of an automobile seat which is normally retained in fixed position in the car.

The car seat includes a base frame 10, a back 11, and a removable seat portion 12.

While the present invention is intended primarily for application to the driver's seat of an automobile, it is to be understood that it may also be embodied in the rear seat of an automobile with equal facility. Furthermore, while the invention is illustrated in conjunction with the removable portion of the seat, it is also to be understood that the back portion of the seat may also be provided with a similar construction.

Figure 1:
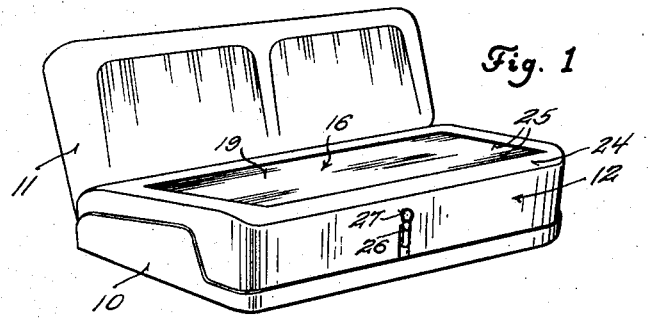
Figure 1 is a perspective view of an automobile seat embodying the teachings of the present invention.
Figure 2:
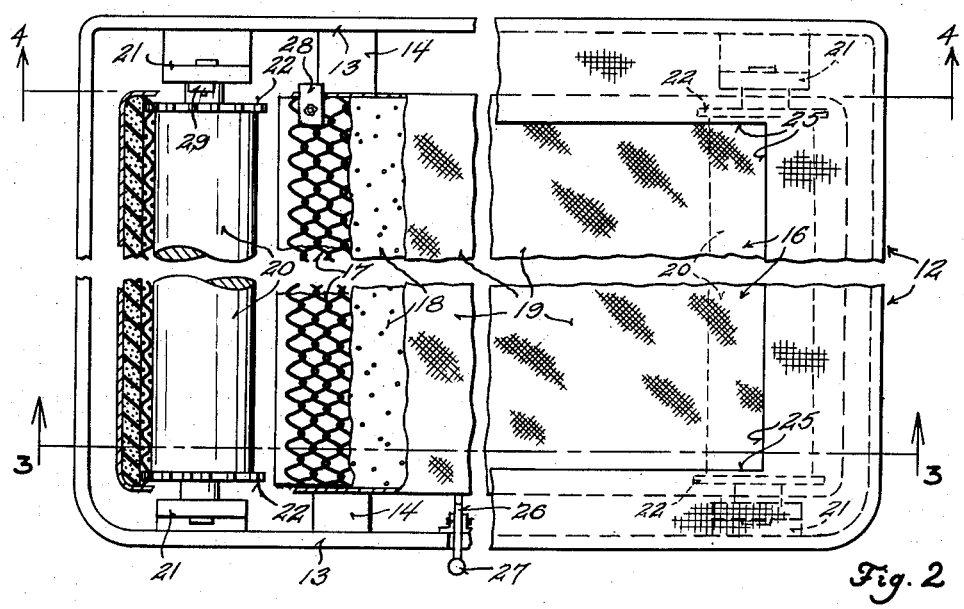
Fig. 2 is a fragmentary top plan view of the automobile seat with parts broken away and some shown in section to illustrate its construction.

Referring more particularly to Fig. 2 of the accompanying drawing, the new and improved automobile seat includes a base portion 13 of standard construction which may be removably positioned in the base frame 10 of the automobile seat in the usual manner. In the present instance, the transversely extending laterally spaced braces 14 are provided with an elevated central portion 15 for a purpose to be hereinafter more specifically described.

The movable element 16 of the present invention may comprise an endless belt including a flexible base portion 17 formed of any suitable material such as interlocked meshed wire. A layer of cushioning material 18, such as foam rubber or the like is attached to the flexible base portion 17 in any approved manner. An outer layer 19 of fabric or other suitable material forms the load supporting surface of the movable element 16. The movable element 16 or endless conveyor is trained about a pair of laterally spaced rollers 20 journaled for rotation in suitable brackets 21 disposed in pairs adjacent the opposite ends of the base portion 13 of the removable seat 12. In order to insure simultaneous uniform longitudinal movement of the front and rear edges of the movable element 16, the opposite ends of each of the rollers 20 are provided with sprockets 22 which are fixedly positioned with respect to the rollers and mesh with the openings formed in the flexible portion 17 of the element 16.

Suitable adjusting means (not shown) may be provided to alter the relative position between the two rollers 20 for the purpose of maintaining the movable element, in the form of the endless conveyor in taut condition at all times.

Figure 3:
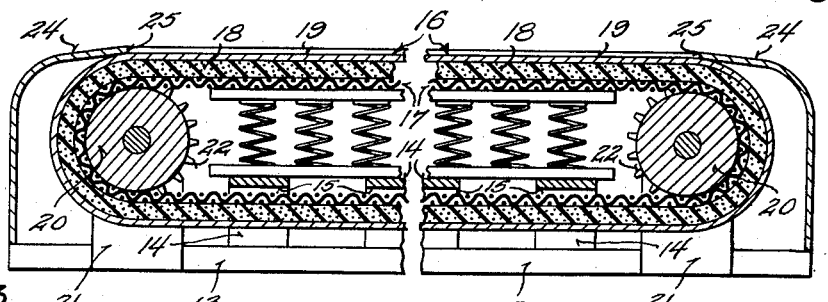
Fig. 3 is a vertical longitudinal sectional view taken on the line 3—3 of Fig. 2 showing the arrangement of the several elements forming the automobile seat.

Referring more particularly to Fig. 3, it will be noted that the under surface of the top run of the movable element 16 is supported in the usual manner by conventional springs supported on the braces 14 of the removable seat portion 12. The elevated central portion 15 of each of the braces 14 are so positioned as to permit unobstructed passage of the lower run of the movable element between its supporting rollers 20. From reference to this figure of the drawing, it will be noted that the upper run of the movable element 16 is substantially coextensive with the length of the removable seat portion 12. Since the movable element 16 provides the load supporting portion of the seat, the usual seat covering 24 is provided with an opening 25 of sufficient size to expose the major portion of the top surface of the movable load supporting element 16. The marginal edge of the opening 25 in the usual covering 24 may be bound in any approved manner to insure neatness of appearance and durability.

From the foregoing description, it will be understood that the movable element 16 in the form of the endless conveyor is adapted for lengthwise movement in either direction with respect to the fixedly positioned removable seat portion 12 so that the person may be seated on the movable element 16 at one side of the seat and move freely with the element 16 to a position adjacent the other end of the seat without sliding across the load supporting surface of the seat.

While the foregoing description has been directed to the principal feature of the present invention, it has been found desirable to incorporate latching means operable to retain the movable element in fixed relationship with the remainder of the seat at times when the movable element is not in use. Furthermore, means have been provided in the form of cooperating stops disposed respectively on the movable element and the fixed portion of the seat for limiting the extent of lengthwise movement of the endless load supporting conveyor. As an additional feature, the stop is adjustably positionable on the movable element so that periodic adjustment of its position along the peripheral edge of the movable element may be effected to insure uniform wear on the entire load supporting surface of the movable element.

The latching means for releasably retaining the movable element 16 in fixed relationship with the frame of the movable seat portion 12 is schematically illustrated and comprises a partially exposed spring urged rockable lever 26 mounted substantially midway between the ends of the seat along the forward marginal edge thereof. One end of the rockable spring urged lever 26 is provided with an operating knob 27 and the other end of the lever 26 is provided with suitable means (not shown) for engaging a portion of the movable element 16 to releasably retain it in fixed relationship with the remainder of the seat.

Figure 4:
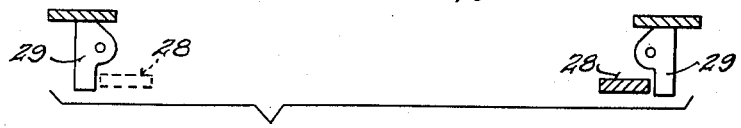
Fig. 4 is a diagrammatic showing of stop means for limiting the extent of travel of the movable load supporting element with respect to the fixedly positioned frame of the seat.

The stop means diagrammatically illustrated in Fig. 4 comprises a bar 28 having one end anchored in any suitable manner to the movable element 16 so that lengthwise movement of the bar 28 to engage one or the other of a pair of stop dogs 29 which are pivotally mounted on a fixed portion of the structure supported by the base portion 13 of the removable seat 12. Engagement of the bar 28 with one of the stop dogs 29 will limit the movement of the element 16 in one direction and engagement of the bar 28 with the other stop dog 29 will limit its movement in the opposite direction.

While the illustrative embodiment of the present invention has been shown in the form of a manually movable element such as an endless conveyor, it is to be understood that the movable element may be power driven if desired. Furthermore, it is to be understood that any suitable anti-friction means may be substituted for the construction illustrated in the accompanying drawing for insuring proper support and free movement of the movable element with respect to the fixed portion of the seat.

From the foregoing description of the invention, it will be noted that a simple and effective means has been provided to permit a person to shift position from one side of the car to the other on the movable element rather than hitching or sliding across the seat.

While the invention has been described in considerable detail in the foregoing specification it is to be understood that various changes may be made in its embodiment without departing from or sacrificing any of the advantages hereinafter claimed.

I claim:
1. An automobile seat comprising a frame adapted to be mounted transversely within the vehicle, a seat back attached to and extending upwardly from the rear portion of said frame, a pair of laterally spaced parallel rollers mounted on said frame adjacent the opposite ends thereof and forwardly of said seat back, and a movable element comprising an endless conveyor trained about said pair of rollers, said movable element forming the load supporting surface of the seat whereby a person seated on said movable element may shift position from one end of the seat to the other by movement of said element with respect to said frame.

2. An automobile seat comprising a frame adapted to be fixedly positioned transversely of and within a vehicle, a seat back attached to and having a length substantially equal to that of said frame and extending upwardly from the rear portion of said frame, a pair of laterally spaced parallel rollers journalled in supports mounted on said frame adjacent the ends thereof and forwardly of said seat back, an endless conveyor mounted for movement in the direction of its length on said rollers, and latching means for releasably retaining said endless conveyor in selected fixed relationship with respect to said frame, said endless conveyor forming the load supporting surface of the seat whereby a person seated on said endless conveyor may shift position from one end of the seat to the other by effecting movement of said endless conveyor with respect to said frame.

3. An automobile seat comprising a frame adapted to be mounted transversely within a vehicle, a seat back attached to and projecting upwardly from the rear portion of said frame, a pair of laterally spaced parallel rollers mounted on said frame adjacent the opposite ends thereof, said rollers being disposed forwardly of said seat back, a movable load supporting element comprising an endless conveyor trained about said rollers for free movement thereon in the direction of its length, and cooperating stop means secured to said movable load supporting element and said seat frame for limiting the extent of movement of said element with respect to said fixedly positioned frame, said stop means on said movable element being adjustably positionable thereon to alter the exposed portion of said movable element to permit even wear throughout its entire length.

4. An automobile seat comprising a frame adapted to be mounted transversely within a vehicle, a seat back attached to and projecting upwardly from the rear portion of said frame and substantially coextensive therewith, a pair of laterally spaced rollers mounted for free rotation on said frame adjacent the opposite ends thereof, said rollers being disposed forwardly of said seat back, a movable load supporting element comprising an endless conveyor trained about said rollers for free movement thereon in the direction of its length, cooperating stop means secured respectively to said movable load supporting element and said seat frame for limiting the extent of movement of said element with respect to said frame, said stop means on said movable element being adjustably positionable thereon to expose different portions of said movable element for effecting even wear throughout its entire length, and latching means for releasably retaining said movable load supporting element in selected fixed positioning with respect to said frame.

5. The combination with an automobile seat adapted to be positioned transversely of a vehicle and including a base and a back projecting upwardly from the rear portion of said base, of a removable seat portion, said seat portion comprising a frame adapted for mounting on said base, a pair of laterally spaced parallel rollers rotatably mounted on said frame adjacent the ends thereof, a movable element comprising an endless conveyor mounted for free movement in the direction of its length on said rollers, said frame, rollers and movable element being disposed forwardly of the back of said automobile seat, said movable element forming the load supporting surface of the seat whereby a person seated on said element may shift position from one end of the seat to the other by moving said element with respect to said frame, and manually operated latching means for selective engagement with said movable element to fixedly position said element with respect to said frame.

6. The combination with an automobile seat adapted to be positioned transversely of a vehicle and including a base and a back projecting upwardly from the rear portion of said base, of a removable seat portion, said seat portion comprising a frame adapted for mounting on said base, a pair of laterally spaced parallel rollers rotatably mounted on said frame adjacent the ends thereof, a movable element comprising an endless conveyor mounted for free movement in the direction of its length on said rollers, said frame, rollers and movable element being disposed forwardly of the back of said automobile seat, said movable element forming the load supporting surface of the seat whereby a person seated on said element may shift position from one end of the seat to the other by moving said element with respect to said frame, and cooperating stop means secured respectively to said movable element and said frame for limiting the extent of movement of said movable element with respect to said frame.

7. The combination with an automobile seat adapted to be positioned transversely of a vehicle and including a base and a back projecting upwardly from the rear portion of said base, of a removable seat portion, said seat portion comprising a frame adapted for mounting on said base, a pair of laterally spaced parallel rollers rotatably mounted on said frame adjacent the ends thereof, a movable element comprising an endless conveyor mounted for free movement in the direction of its length on said rollers, said frame, rollers and movable element being disposed forwardly of the back of said automobile seat, said movable element forming the load supporting surface of the seat whereby a person seated on said element may shift position from one end of the seat to the other by moving said element with respect to said frame, cooperating stop means secured respectively to said movable element and said frame for limiting the extent of movement of said element with respect to said frame, and manually operated latching means for selective engagement with said movable element to fixedly position said element with respect to said frame.

References Cited in the file of this patent

UNITED STATES PATENTS

| 805,805 | Loose | Nov. 28, 1905 |
| 1,273,953 | Torano | July 30, 1918 |
| 1,390,506 | Carter | Sept. 13, 1921 |
| 2,324,207 | Gsell | July 13, 1943 |
| 2,615,493 | Hunter | Oct. 28, 1952 |

FOREIGN PATENTS

| 7,776 | Great Britain | Nov. 30, 1905 |